(12) United States Patent
Xu et al.

(10) Patent No.: US 11,419,122 B2
(45) Date of Patent: Aug. 16, 2022

(54) TIME DOMAIN BUNDLING OF REFERENCE SIGNALS BASED ON TRANSMISSION CONFIGURATION INDICATOR (TCI) STATES

(71) Applicant: QUALCOMM Incorporated, San Diego, CA (US)

(72) Inventors: Huilin Xu, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 16/936,359

(22) Filed: Jul. 22, 2020

(65) Prior Publication Data
US 2021/0029707 A1   Jan. 28, 2021

(30) Foreign Application Priority Data
Jul. 26, 2019   (GR) .............................. 20190100319

(51) Int. Cl.
*H04W 72/04* (2009.01)
*H04L 5/10* (2006.01)
*H04L 5/00* (2006.01)
*H04W 56/00* (2009.01)

(52) U.S. Cl.
CPC ....... *H04W 72/0493* (2013.01); *H04L 5/0051* (2013.01); *H04L 5/10* (2013.01); *H04W 56/001* (2013.01); *H04W 72/042* (2013.01); *H04W 72/0446* (2013.01)

(58) Field of Classification Search
CPC ........... H04W 72/0493; H04W 72/042; H04W 72/0446; H04W 72/04; H04W 56/001; H04L 5/0051; H04L 5/10
See application file for complete search history.

(56) References Cited

U.S. PATENT DOCUMENTS

| | | | |
|---|---|---|---|
| 2015/0280876 A1* | 10/2015 | You ........................... | H04L 1/08 370/329 |
| 2019/0104532 A1* | 4/2019 | Park .................. | H04W 72/1263 |
| 2019/0222380 A1 | 7/2019 | Manolakos et al. | |
| 2020/0045709 A1* | 2/2020 | Seo ....................... | H04L 5/0048 |
| 2020/0314880 A1 | 10/2020 | Cirik et al. | |
| 2020/0351841 A1* | 11/2020 | Cirik ..................... | H04L 5/0048 |
| 2021/0058906 A1* | 2/2021 | Seo ....................... | H04B 7/0617 |
| 2021/0168636 A1* | 6/2021 | Chen ..................... | H04L 5/0048 |
| 2021/0185609 A1* | 6/2021 | Zhou ..................... | H04L 69/28 |
| 2021/0259009 A1* | 8/2021 | Chen ................. | H04W 72/1289 |

OTHER PUBLICATIONS

International Search Report and Written Opinion—PCT/US2020/043314—ISAEPO—dated Oct. 26, 2020.

* cited by examiner

*Primary Examiner* — Candal Elpenord
(74) *Attorney, Agent, or Firm* — Loza & Loza

(57) ABSTRACT

Methods and apparatus are disclosed according to certain aspects of the present disclosure. The methods and apparatus effect determination that a transmission configuration indicator (TCI) state is to be changed for a wireless transmission channel, where the channel includes time domain bundling of demodulation reference signals (DMRSs) across two or more symbols. Responsive to the determination that the TCI state is to be changed, the time domain bundling of the DMRSs in the transmission channel is selectively stopped prior to the TCI state change.

30 Claims, 13 Drawing Sheets

TIME DOMAIN BUNDLING OF REFERENCE SIGNALS BASED ON TRANSMISSION CONFIGURATION INDICATOR (TCI) STATES

PRIORITY

This application claims priority to and the benefit of foreign patent application No. 20190100319 filed in the Greek Patent Office (i.e., the Hellenic Industrial Property Organization (HIPO)) on Jul. 26, 2019, the entire content of which is incorporated herein by reference as if fully set forth below in its entirety and for all applicable purposes.

TECHNICAL FIELD

Certain aspects of the present disclosure generally relate to wireless communications and, more particularly, to time domain bundling of reference signals based on Transmission Configuration Indicator (TCI) states in a wireless communication system.

INTRODUCTION

In wireless systems, such as 3GPP New Radio (NR) systems, Demodulation Reference Signals (DMRSs) may be bundled in the time domain over the duration of multiple transmission symbols. Time domain bundled DMRSs in different symbols are transmitted with phase continuity, such as phase continuity between carrier frequencies or a precoding matrix, or both. Given this phase continuity, time domain bundled DMRSs in different symbols received at a user equipment (UE) may be coherently filtered such that the filtered channel estimate will have a better quality than a wireless channel estimate from DMRSs (or other reference signals) that are not time domain bundled.

Further, in certain wireless systems, a Transmission Configuration Indicator (TCI) is used to indicate a QCL (Quasi Co-Location) relationship between one or more downlink (DL) reference signals (e.g., DL RS) and DMRS antenna ports for particular channels such as Physical Downlink Control Channels (PDCCH) and Physical Downlink Shared Channels (PDSCH), where two antenna ports are quasi co-located if properties of the channel over which a symbol on one antenna port is conveyed can be inferred from the channel over which a symbol on the other antenna port is conveyed. In certain aspects, a UE may determine a new TCI state within a time duration where DMRSs associated with multiple transmissions of the wireless channel (e.g., wireless downlink (DL) channels PDCCH or PDSCH) are time domain bundled. For example, multiple transmissions may correspond to the repetition of the same DL channel payload or different payloads. When a new TCI state is determined by the UE, a Quasi Co-Location (QCL) relationship may change for the DMRS antenna ports in the QCL type of any of the DL RSs, or the addition or removal of a DL RS.

In these situations, transition between old and new TCI states may not always guarantee phase continuity of the DMRS port(s) after the TCI state change as the conditions for time domain bundling may not continue to hold after the state change, and there may be uncertainty how a particular UE is configured to handle DMRS bundling if a QCL changes. If the conditions do not hold, there may situations where there will be no phase continuity, and the DMRS time domain bundling continuity breaks such that DMRS symbols will not be able to be time domain bundled.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect, the present disclosure features a method of wireless communication including determining a transmission configuration indicator (TCI) state is to be changed for a wireless transmission channel, where the wireless transmission channel includes time domain bundling of demodulation reference signals (DMRSs) across two or more symbols in the wireless transmission channel. Additionally, the method includes selectively stopping time domain bundling of the DMRSs in the wireless transmission channel responsive to the determination that the TCI state is to be changed, wherein the stopping of the time domain bundling of the DMRSs is performed prior to the TCI state change.

According to yet further aspects, an apparatus for wireless communication is disclosed including a processor, a transceiver communicatively coupled to the processor, and a memory communicatively coupled to the processor. The processor is configured to determine a transmission configuration indicator (TCI) state is to be changed for a wireless transmission channel, the wireless transmission channel including time domain bundling of demodulation reference signals (DMRSs) across two or more symbols in the wireless transmission channel. Additionally, the processor is configured to selectively stop time domain bundling of the DMRSs in the wireless transmission channel responsive to the determination that the TCI state is to be changed, wherein the stopping of the time domain bundling of the DMRSs is performed prior to the TCI state change.

In yet further aspects, an apparatus for wireless communication is disclosed having means for determining a transmission configuration indicator (TCI) state is to be changed for a wireless transmission channel, the wireless transmission channel including time domain bundling of demodulation reference signals (DMRSs) across two or more symbols in the wireless transmission channel. Additionally, the apparatus includes means for selectively stopping time domain bundling of the DMRSs in the wireless transmission channel responsive to the means for determining a TCI state to be changed determining that the TCI state is to be changed, wherein the stopping of the time domain bundling of the DMRSs is performed prior to the TCI state change.

A non-transitory computer-readable medium storing computer-executable code is disclosed including code for causing a computer to determine a transmission configuration indicator (TCI) state is to be changed for a wireless transmission channel, the wireless transmission channel including time domain bundling of demodulation reference signals (DMRSs) across two or more symbols in the wireless transmission channel. The code also causes the computer to selectively stop time domain bundling of the DMRSs in the wireless transmission channel responsive to the determination that the TCI state is to be changed, wherein the stopping is performed prior to the TCI state change.

These and other aspects of the present disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
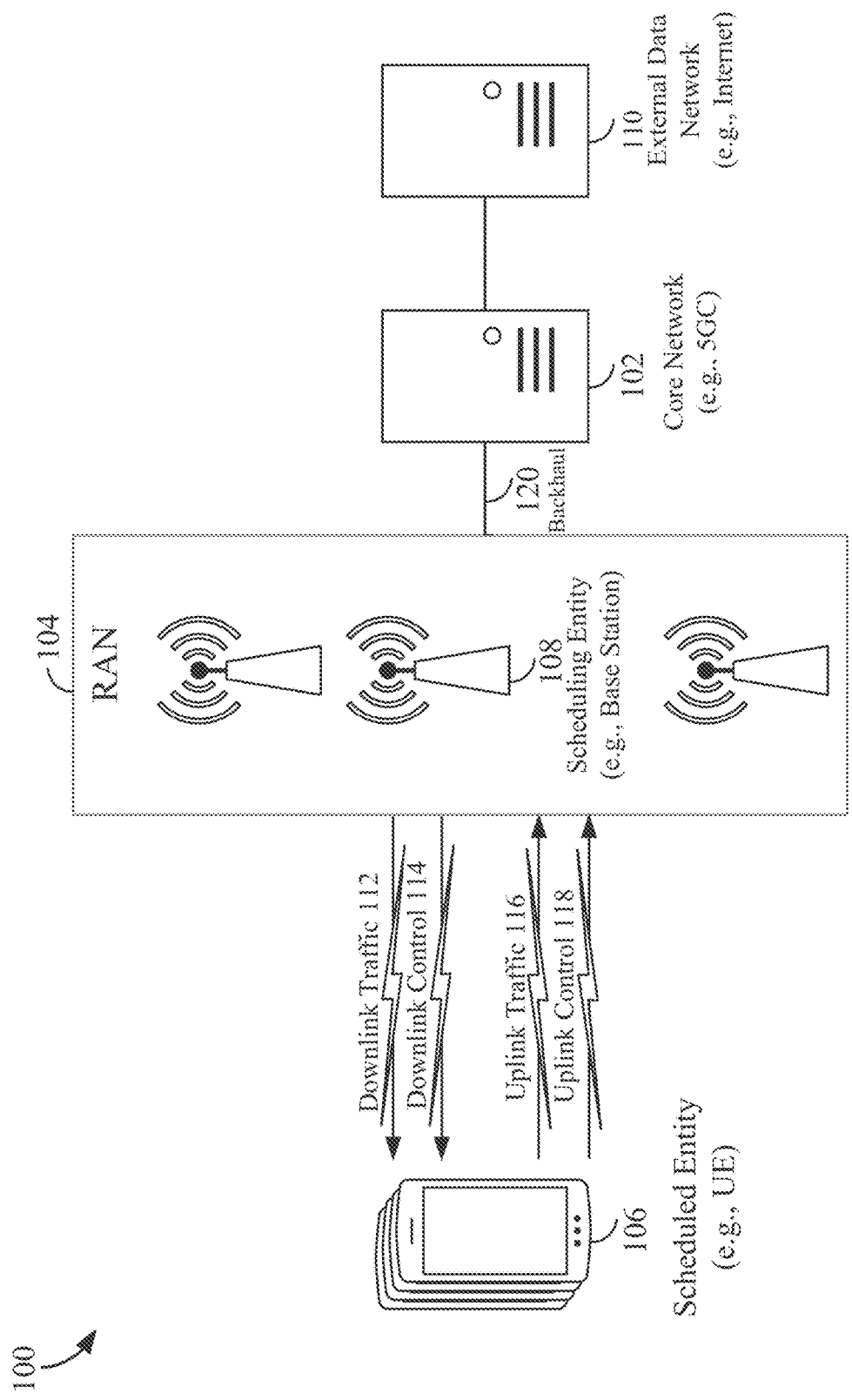
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As discussed above, when wireless transmissions experience a transition between old and new TCI states, phase continuity of the DMRS antenna port(s) after the TCI state change are not guaranteed as the conditions for time domain bundling may not continue to hold after the state change, and there may be uncertainty how a particular UE is configured to handle DMRS bundling if a QCL changes. Accordingly, it would be beneficial to provide a scheduling slot from the scheduling entity where the PDCCH is divided into multiple spans separated in time within the scheduling slot in order to distribute the control information (e.g., DCIs) in time (and frequency) over a scheduling cell's slot. In this manner, the scheduled entities (i.e., UEs) may be able to more quickly obtain DCIs to begin PCSCH decoding, thus mitigating the possibility of improper or incomplete PDSCH decoding. Various methods and apparatus for implementing a multiple time span PDCCH to distribute DCIs for quicker decoding are disclosed herein.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
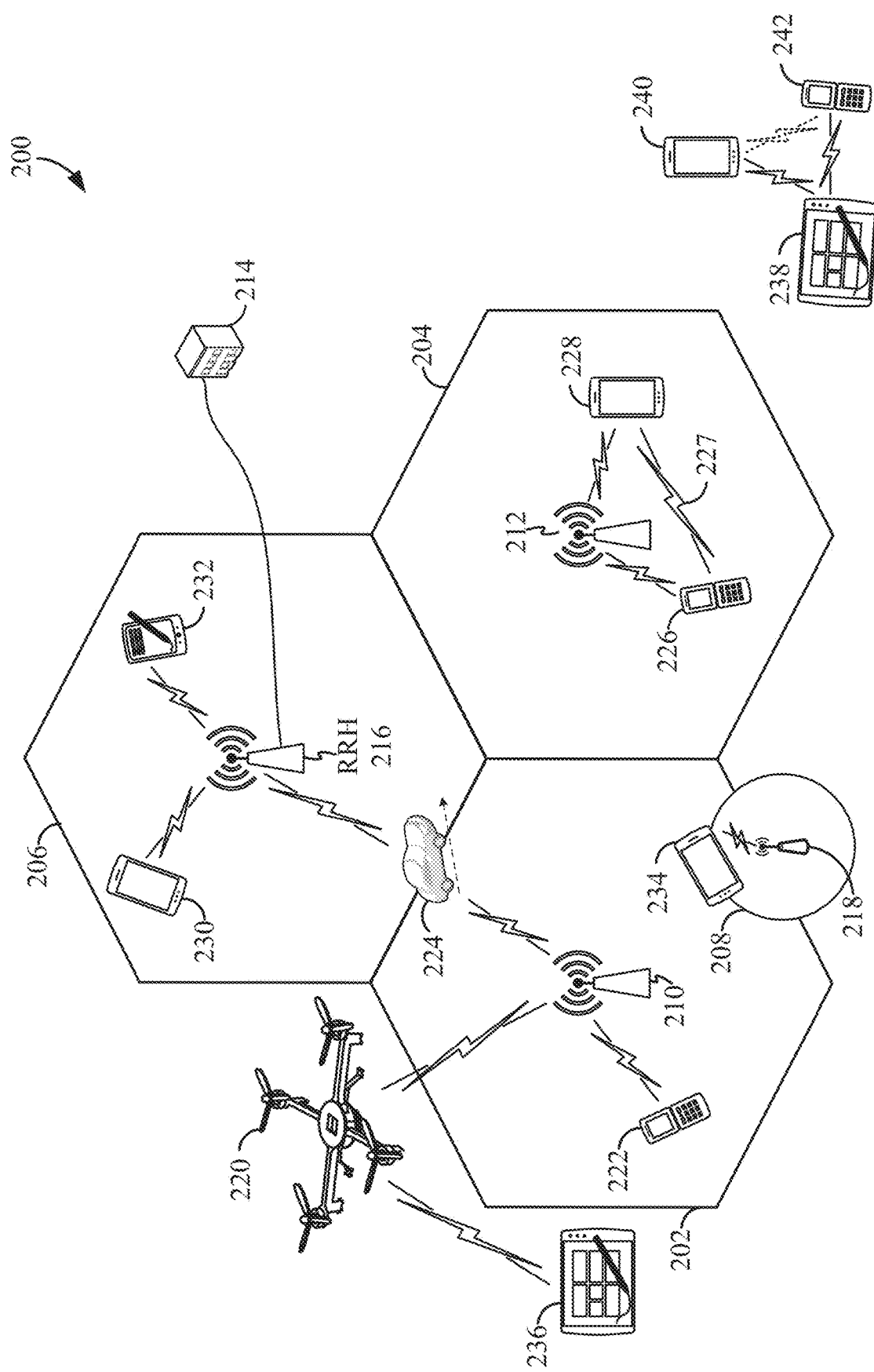
FIG. 2 is a conceptual illustration of an example of a wireless communications network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATS. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
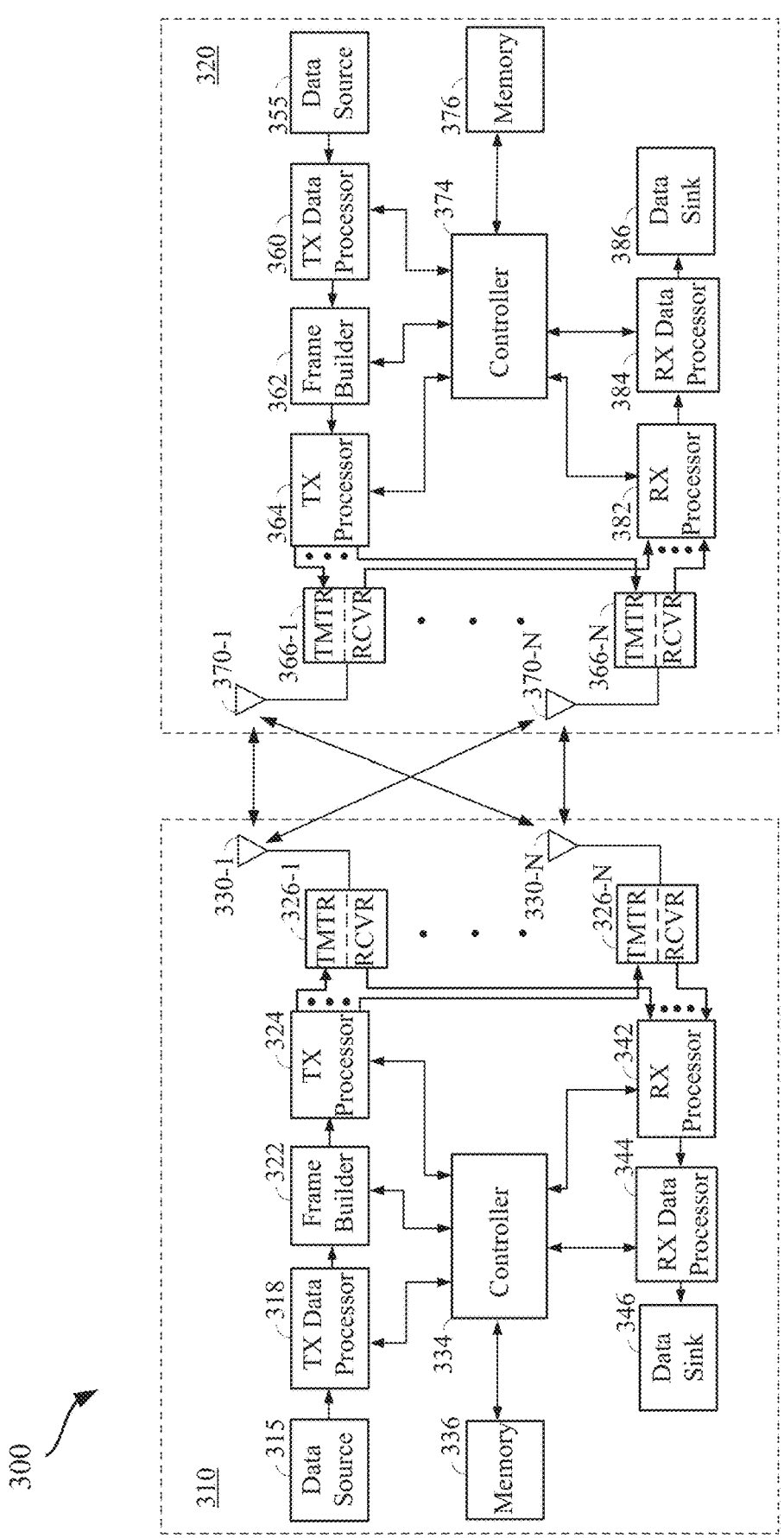
FIG. 3 is a block diagram conceptually illustrating an example of an eNB or gNB in communication with a user equipment (UE) in a wireless communications network in accordance with certain aspects of the present disclosure.

FIG. 3 is a block diagram conceptually illustrating an example of an eNB or gNB in communication with a user equipment (UE) in a wireless communications network, in accordance with certain aspects of the present disclosure. In this example, the block diagram 300 shows a first wireless node 310, which may be a base station or gNB, and a second wireless node 320, such as a UE of the wireless communication system 300. The first wireless node 310 is a transmitting entity for the downlink and a receiving entity for the uplink, such as a scheduling entity according to some aspects. The second wireless node 320 is a transmitting entity for the uplink and a receiving entity for the downlink, such as a scheduled entity according to some aspects. According to further aspects, a "transmitting entity" may be an independently operated apparatus or wireless node capable of transmitting data via a wireless channel, and a "receiving entity" may be an independently operated apparatus or wireless node capable of receiving data via a wireless channel.

For transmitting data, the first wireless node 310 comprises a transmit data processor 318, a frame builder 322, a transmit processor 324, a plurality of transceivers 326-1 to 326-N, and a plurality of antennas 330-1 to 330-N. The first wireless node 310 also comprises a controller 334 configured to control operations of the first wireless node 310, as discussed further below.

In operation, the transmit data processor 318 receives data (e.g., data bits) from a data source 315, and processes the data for transmission. For example, the transmit data processor 318 may encode the data (e.g., data bits) into encoded data, and modulate the encoded data into data symbols. The transmit data processor 318 may support different modulation and coding schemes (MCSs). For example, the transmit data processor 318 may encode the data (e.g., using low-density parity check (LDPC) encoding) at any one of a plurality of different coding rates. Also, the transmit data processor 318 may modulate the encoded data using any one of a plurality of different modulation schemes, including, but not limited to, BPSK, QPSK, 16QAM, 64QAM, 64APSK, 128APSK, 256QAM, 1024QAM, and 256APSK.

In certain aspects, the controller 334 may send a command to the transmit data processor 318 specifying which modulation and coding scheme (MCS) to use (e.g., based on channel conditions of the downlink), and the transmit data processor 318 may encode and modulate data from the data source 315 according to the specified MCS. It is to be appreciated that the transmit data processor 318 may perform additional processing on the data such as data scrambling, and/or other processing. The transmit data processor 318 outputs the data symbols to the frame builder 322.

The frame builder 322 constructs a frame (also referred to as a packet), and inserts the data symbols into a data payload of the frame. Exemplary frame structures or formats will be discussed in more detail below. The frame builder 322 outputs the frame to the transmit processor 324. The transmit processor 324 processes the frame for transmission on the downlink. For example, the transmit processor 324 may support different transmission modes such as an orthogonal frequency-division multiplexing (OFDM) transmission mode and a single-carrier (SC) transmission mode. In this example, the controller 334 may send a command to the transmit processor 324 specifying which transmission mode to use, and the transmit processor 324 may process the frame for transmission according to the specified transmission mode.

In certain aspects, the transmit processor 324 may support multiple-output-multiple-input (MIMO) transmissions. In these aspects, the first wireless node 310 includes multiple antennas 330-1 to 330-N and multiple transceivers 326-1 to 326-N (e.g., one for each antenna). The transmit processor 324 may perform spatial processing on the incoming frames and provide a plurality of transmit frame streams for the plurality of antennas. The transceivers 326-1 to 326-N receive and process (e.g., convert to analog, amplify, filter, and frequency upconvert) the respective transmit frame streams to generate transmit signals for transmission via the antennas 330-1 to 330-N. Additionally, the For transmitting data, the second wireless node or UE 320 comprises a transmit data processor 360, a frame builder 362, a transmit processor 364, a plurality of transceivers 366-1 to 366-N, and a plurality of antennas 370-1 to 370-N. The UE 320 may transmit data to the first wireless node 310 on the uplink, and/or transmit data to another access terminal (e.g., for peer-to-peer communication). The UE 320 also comprises a controller 374 configured to control operations of the UE 320, as discussed further below.

In operation, the transmit data processor 360 receives data (e.g., data bits) from a data source 355, and processes (e.g., encodes and modulates) the data for transmission. The transmit data processor 360 may support different MCSs. For example, the transmit data processor 360 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 374 may send a command to the transmit data processor 360 specifying which MCS to use (e.g., based on channel conditions of the uplink), and the transmit data processor 360 may encode and modulate data from the data source 355 according to the specified MCS. It is to be appreciated that the transmit data processor 360 may perform additional processing on the data. The transmit data processor 360 outputs the data symbols to the frame builder 362.

The frame builder 362 constructs a frame, and inserts the received data symbols into a data payload of the frame. Exemplary frame structures or formats are discussed further below. The frame builder 362 outputs the frame to the transmit processor 364. The transmit processor 364 processes the frame for transmission. For example, the transmit processor 364 may support different transmission modes such as an OFDM transmission mode and an SC transmission mode. In this example, the controller 374 may send a command to the transmit processor 364 specifying which transmission mode to use, and the transmit processor 364 may process the frame for transmission according to the specified transmission mode.

In certain aspects, the transmit processor 364 may support multiple-output-multiple-input (MIMO) transmission. In these aspects, the UE 320 includes multiple antennas 370-1 to 370-N and multiple transceivers 366-1 to 366-N (e.g., one for each antenna). The transmit processor 364 may perform spatial processing on the incoming frame and provide a plurality of transmit frame streams for the plurality of antennas. The transceivers 366-1 to 366-N receive and process (e.g., convert to analog, amplify, filter, and frequency upconvert) the respective transmit frame streams to generate transmit signals for transmission via the antennas 370-1 to 370-N. Additionally, the transmit processor 364 may include layer mapping, precoding, resource element mapping functionalities for mapping to various antenna ports, wherein an antenna port is logical concept where each antenna port represents a specific channel model, where each antenna port will have its own reference signal. Each antenna port will carry its own resource grid and a specific set of reference signals in the grid.

For receiving data, the access point 310 comprises a receive processor 342, and a receive data processor 344. In operation, the transceivers 326-1 to 326-N receive signals (e.g., from the UE 320) via the antennas 330-1 to 330-N, and process (e.g., frequency downconvert, amplify, filter and convert to digital) the received signals.

The receive processor 342 receives the outputs of the transceivers 326-1 to 326-N, and processes the outputs to recover data symbols. For example, the first wireless node 310 may receive data (e.g., from the UE 320) in a frame. In this example, the receive processor 342 may detect the start of the frame using the STF sequence in the preamble of the frame. The receive processor 342 may also use the STF for automatic gain control (AGC) adjustment. The receive processor 342 may also perform channel estimation (e.g., using the channel estimation (CE) sequence or field in the preamble of the frame) and perform channel equalization on the received signal based on the channel estimation.

The receive processor 342 may also recover information (e.g., MCS scheme) from the header of the frame, and send the information to the controller 334. After performing channel equalization, the receive processor 342 may recover data symbols from the frame, and output the recovered data symbols to the receive data processor 344 for further processing. It is to be appreciated that the receive processor 342 may perform other processing.

The receive data processor 344 receives the data symbols from the receive processor 342 and an indication of the corresponding MSC scheme from the controller 334. The receive data processor 344 demodulates and decodes the data symbols to recover the data according to the indicated MSC scheme, and outputs the recovered data (e.g., data bits) to a data sink 346 for storage and/or further processing.

As discussed above, the UE 320 may transmit data using an OFDM transmission mode or an SC transmission mode. In this case, the receive processor 342 may process the receive signal according to the selected transmission mode. Also, as discussed above, the transmit processor 364 may support multiple-input-multiple-output (MIMO) transmission. In this case, the first wireless node 310 includes multiple antennas 330-1 to 330-N and multiple transceivers 326-1 to 326-N (e.g., one for each antenna). Each transceiver 326 receives and processes (e.g., frequency downconverts, amplifies, filters, and converts to digital) the signal from the respective antenna 330. The receive processor 342 may perform spatial processing on the outputs of the transceivers 326-1 to 226-N to recover the data symbols.

For receiving data, the UE 320 comprises a receive processor 382, and a receive data processor 384. In operation, the transceivers 366-1 to 366-N receive signals (e.g., from the first wireless node 310 or another access terminal) via the antennas 370-1 to 370-N, and process (e.g., frequency downconvert, amplify, filter and convert to digital) the received signals.

The receive processor 382 receives the outputs of the transceivers 366-1 to 366-N, and processes the outputs to recover data symbols. For example, the UE 320 may receive data (e.g., from the first wireless node 310 or another access terminal) in a frame, as discussed above. The receive processor 382 may also recover information (e.g., MCS scheme) from the header of the frame, and send the information to the controller 374. After performing channel equalization, the receive processor 382 may recover data symbols from the frame, and output the recovered data symbols to the receive data processor 384 for further processing. It is to be appreciated that the receive processor 382 may perform other processing.

The receive data processor 384 receives the data symbols from the receive processor 382 and an indication of the corresponding MSC scheme from the controller 374. The receive data processor 384 demodulates and decodes the data symbols to recover the data according to the indicated MSC scheme, and outputs the recovered data (e.g., data bits) to a data sink 386 for storage and/or further processing.

As discussed above, the first wireless terminal 310 or another access terminal may transmit data using an OFDM transmission mode or a SC transmission mode. In this case, the receive processor 382 may process the receive signal according to the selected transmission mode. Also, as discussed above, the transmit processor 324 may support multiple-output-multiple-input (MIMO) transmission. In this case, the UE 320 includes multiple antennas 370-1 to 370-N and multiple transceivers 366-1 to 366-N (e.g., one for each antenna). Each transceiver 366 receives and processes (e.g., frequency downconverts, amplifies, filters, and converts to digital) the signal from the respective antenna. The receive processor 382 may perform spatial processing on the outputs of the transceivers to recover the data symbols.

As shown in FIG. 3, the first wireless terminal 310 also comprises a memory 336 coupled to the controller 334. The memory 336 may store instructions that, when executed by the controller 334, cause the controller 334 to perform one or more of the operations described herein. Similarly, the UE 320 also comprises a memory 376 coupled to the controller 374. The memory 376 may store instructions that, when executed by the controller 374, cause the controller 374 to perform the one or more of the operations described herein.

Figure 4:
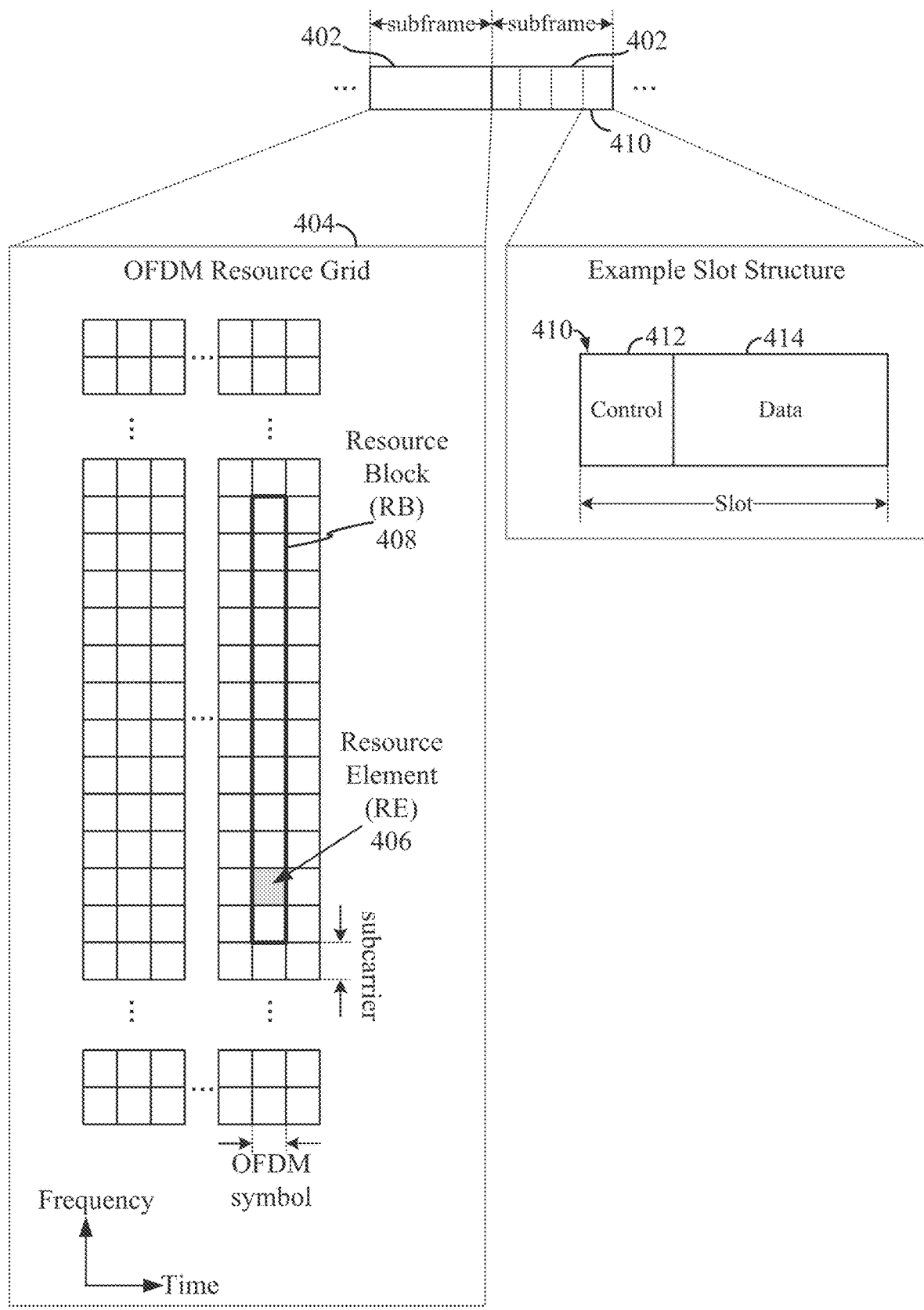
FIG. 4 illustrates an organization of wireless resources in an air interface utilizing orthogonal frequency divisional multiplexing (OFDM).

Various aspects of the present disclosure will be described with reference to an OFDM waveform, schematically illustrated in FIG. 4. As referred to within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE. In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., the PDCCH), and the data region 414 may carry data channels (e.g., PDSCH or PUSCH). Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative-acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such user or traffic data may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1-4 are not necessarily all the channels or carriers that may be utilized between a scheduling entity (e.g., 108) and scheduled entities (e.g., 106), and those of ordinary skill in the art will recognize that other channels or carriers may be utilized in addition to those illustrated, such as other traffic, control, and feedback channels. These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

It is noted that in 5G NR, for example, among various reference signals, four main reference signals that are typically used in transmissions are the demodulation reference signal (DMRS), the phase-tracking reference signal (PTRS), the sounding reference signal (SRS), and the channel-state information reference signal (CSI-RS). DMRSs are used in 5G NR to estimate the radio channel for demodulation, such as estimation at a gNB or at a UE. Furthermore, DMRSs may be UE-specific, are capable of being beamformed, may be confined in a scheduled resource, and may be transmitted only when necessary, both in DL and in UL transmissions. To support multiple-layer MIMO transmission, multiple orthogonal DMRS ports can be scheduled, one for each layer. Typically, the basic DMRS pattern is front loaded, as the DMRS design takes into account the early decoding requirement to support low-latency applications. For low-speed scenarios, DMRS may use lower density in the time domain.

As discussed above, DMRSs may be bundled in the time domain within transmission frames. Time domain bundled DMRSs are bundled in different symbols, which are transmitted at least with phase continuity for carriers, precoding matrices (e.g., resource grids), or both. At a UE, channel estimates obtained from time domain bundled DMRSs in different symbols can be coherently filtered. In such case, the filtered channel estimate has been shown to have better quality with time domain bundling compared to estimates using DMRS without time domain bundling (e.g., a greater loss in the processing gain during filtering occurs when time domain bundling of DMRS is not used during filtering at the UE).

Figure 5:
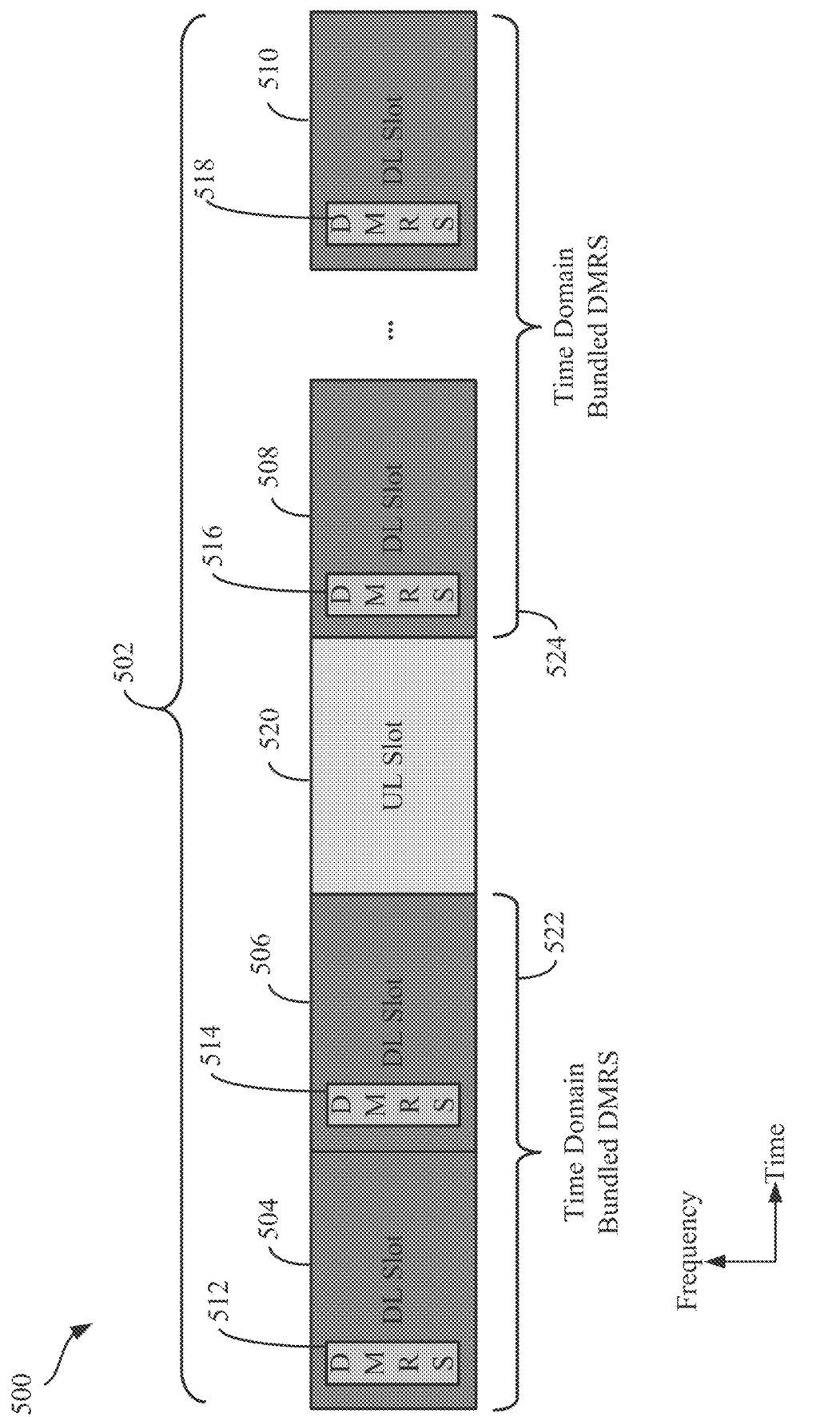
FIG. 5 illustrates a plot of wireless resource configurations with time domain bundling of DMRS in a wireless communication system.

FIG. 5 illustrates an example 500 of a wireless resource configuration with time domain bundling of the demodulation reference signals (DMRSs) utilized within transmissions in a wireless communication system. Initially, a UE may determine a number of DMRS symbols that are to be time domain bundled based on some predetermined network configuration, which would span an entire frame 502 or similar time duration, for example. This expected network configuration includes multiple DL slots 504, 506, 508, 510, each with DMRSs 512, 514, 516, 518 that are time domain bundled. In one example, however, a UE might cause the further update of the pattern of the DMRS symbols that can be bundled based on other information, such as the UE determining a slot format configuration downlink control information (DCI) that sets one of the slots 520 in a frame to UL symbols for transmission by the UE. In such case, the DMRSs may only be time domain bundled within consecutive slots indicated by time durations 522 or 524, which respectively encompass slots 504 and 506, or 508 through 510. It is noted here that the representations of DMRSs 512-518 in FIG. 5 are not intended to be limiting in size or to locations within the illustrated slots, and also that these signals may comprise one symbol in a slot or multiple symbols within the slot.

In certain wireless systems, such as 5G NR, a Transmission Configuration Indicator (TCI) state is used to indicate a Quasi Co-Location (QCL) relationship between one or two downlink reference signals (DL RSs) and the DMRS antenna port(s) for the physical downlink control channel (PDCCH) and the physical downlink shared channel (PDSCH). Two antenna ports are considered to be Quasi Co-Located (QCL'ed) if the properties of the channel over which a symbol on one antenna port is conveyed can be inferred from the channel over which a symbol on the other antenna port is conveyed.

Four types of QCL have been defined in the 5G NR standards and are designated as Types A through D. Specifically, the QCL types are defined as QCL-TypeA, which includes Doppler shift, Doppler spread, average delay, delay spread; QCL-TypeB including Doppler shift and Doppler spread; QCL-TypeC including Doppler shift and average delay; and QCL-TypeD including a spatial receiver (Rx) parameter. If two DL RSs are included in a TCI state, the QCL types will always be different no matter whether the two DL RSs are the same DL RS or are different DL RSs. For purposes of this discussion it is noted that the DL RSs could be a synchronization signal block (SSB) including the synchronization signal SS (e.g., a primary synchronization signal (PSS) and/or a secondary synchronization signal (SSS)) and a physical broadcast channel (PBCH), or a CSI-RS. Additionally, with certain QCL types, two signal ports are considered to be QCL'ed if the channels share the same property indicated by the QCL type.

When a TCI state is determined for a PDSCH DMRS, it is noted that a UE may be configured with a set of the possible TCI states that are communicated to the UE in a radio resource control (RRC) level message (e.g., a PDSCH-Config message). In an example, the RRC level message may be configured with a TCI state that serves to associate one or two DL RSs with a corresponding quasi-colocation (QCL) type. In particular, a UE will receive a media access control (MAC) control element (CE) or "MAC CE" command to down select a subset of TCI states configured in the RRC message. Additionally, the UE receives downlink control information (DCI) to further select a particular single TCI state from the subset of TCI states.

When a TCI state is determined for a PDCCH DMRS, it is noted that a UE may be configured with a set of the possible TCI states using the control resource set (CORESET) configuration. This set of TCI states is a subset of TCI states for the PDSCH, which is configured by the PDSCH-Config message. A UE will receive a MAC CE activation command for one TCI state for the CORESET for the PDCCH DMRS.

Of further note, if only one TCI state is determined in any step, subsequent steps are not needed. Also, if a single TCI state cannot be determined during a transition state or due to the lack of configuration signaling, a default QCL relationship is then normally used.

In light of the TCI state determination being normally utilized, it is noted that a UE may determine a new TCI state within the duration where the DMRS associated with multiple transmissions of the DL channels (i.e., PDCCH or PDSCH) are time domain bundled, such as was illustrated in FIG. 5. The multiple transmissions may correspond to the repetition of the same DL channel payload in some cases or different payloads in other cases or a combination of these two. When a new TCI state is determined by the UE, the QCL relationship may change for the DMRS port(s) in the QCL type of any of the DL RSs, or for the addition or removal of a DL RS. This gives rise to the possibility that the old and new TCI states may not always guarantee phase continuity of the DMRS port(s) before and after the TCI state change such that the conditions for time domain bundling of the DMRSs may not hold or exist anymore.

An exemplary information element (IE) of the TCI-State is illustrated in Table 1 below where one or two DL reference signals are associated with a corresponding QCL type.

TABLE 1

| TCI-State information element | |  |
|---|---|---|
| TCI-State ::= | SEQUENCE { | |
|    tci-StateId | TCI-StateId, | |
|    qcl-Type1 | QCL-Info, | |
|    qcl-Type2 | QCL-Info | OPTIONAL, -- Need R |
|    ... | | |
| } | | |
| QCL-Info ::= | SEQUENCE { | |
|    cell | ServCellIndex | OPTIONAL, -- Need R |
|    bwp-Id | BWP-Id | OPTIONAL, -- Cond CSI-RS-Indicated |
|    referenceSignal | CHOICE { | |
|       csi-rs | NZP-CSI-RS-ResourceId, | |
|       ssb | SSB-Index | |
|    }, | | |
|    qcl-Type | ENUMERATED {typeA, typeB, typeC, typeD}, | |
|    ... | | |
| } | | |

In certain aspects, a UE assumption for DMRS bundling behavior may be ambiguous when the QCL changes and, if there is no phase continuity for the DMRS time domain bundling, continuity might break during TCI state changes. Accordingly, the present disclosure provides methods and apparatus for ensuring the active management of time domain bundling of DMRSs when TCI state changes occur. In certain aspects, the present disclosure provides that whenever a new TCI state is configured or determined for the DL channel, the time domain bundling of the associated DMRS is either selectively stopped or not stopped at the last DL channel transmission before the new TCI state is applied for the DL channel. With this methodology, potential breaks in continuity are anticipated and a breakdown thereof is averted.

Figure 6:
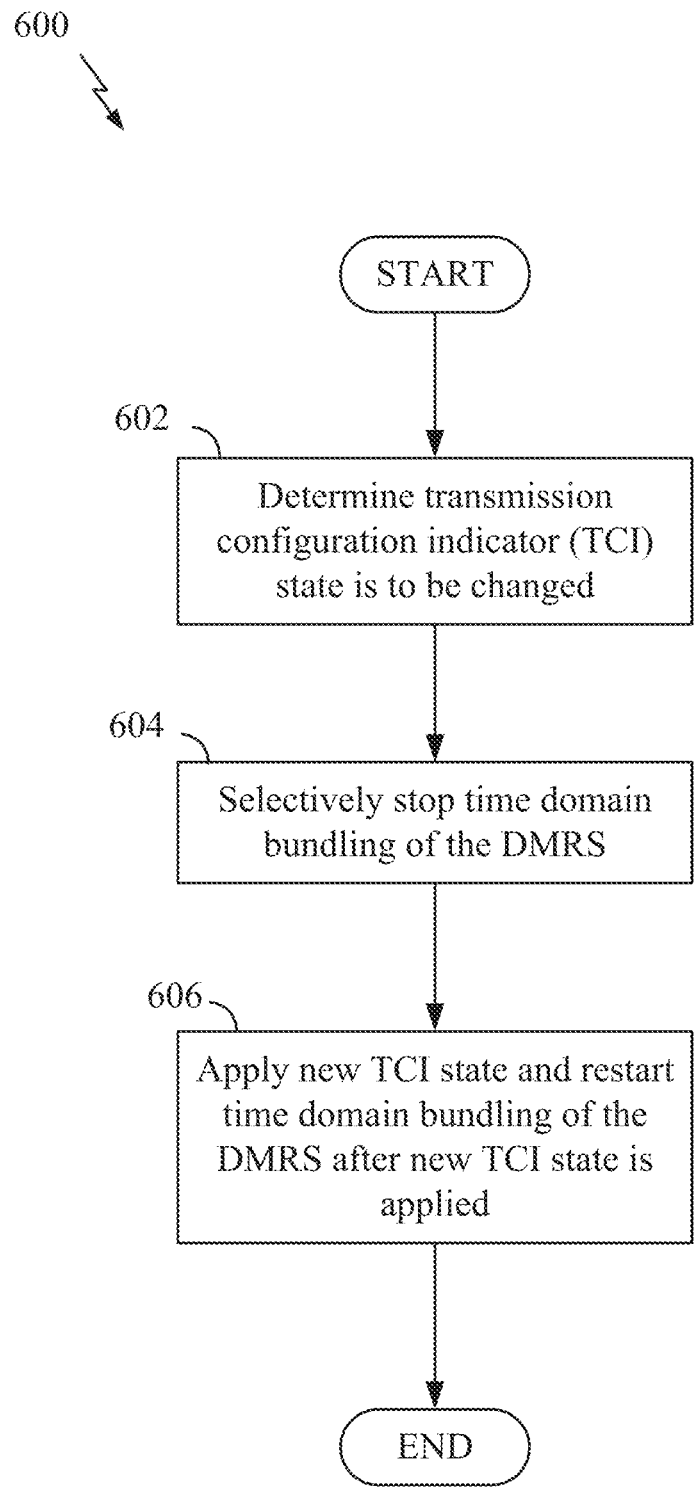
FIG. 6 illustrates a flow diagram of an exemplary method for management of DMRS time domain bundling according to certain aspects of the present disclosure.

FIG. 6 illustrates a flow diagram of an exemplary method 600 for management of DMRS time domain bundling according to certain aspects of the present disclosure. As shown, method 600 includes determining that a transmission configuration indicator (TCI) state is to be changed for a wireless transmission channel as shown at block 602. The transmission channel includes time domain bundling of demodulation reference signals (DMRSs) across two or more symbols in the transmission channel, such as a PDSCH or PDCCH channel. In an aspect, the determination process in block 602 may be effected by a gNB, scheduling entity, or base station.

As shown at block 604 responsive to the determination that the TCI state is to be changed, the time domain bundling of the DMRSs in the transmission channel is selectively stopped (e.g., is stopped conditional on the determination that the TCI state is to be changed and also subject to certain conditions being met as will be discussed in more detail below). In an aspect, the stopping is selectively applied based on various other conditions that may be considered when a TCI change is determined and these conditions will be discussed in more detail below. After stopping is applied as shown at block 604, the method 600 may then further include a reset or restart of the DRMS time domain bundling wherein the DMRS time domain bundling is restarted based on one or more predetermined conditions as shown in block 606. In one aspect, the reset or restart of DMRS time domain bundling is effected after the new TCI state is applied. It is further noted that selective stopping implies that DMRS time domain bundling may not be stopped under certain conditions, even though a TCI state change is set to occur, and examples of such conditions are discussed later herein in connection with FIGS. 8-11.

Figure 7:
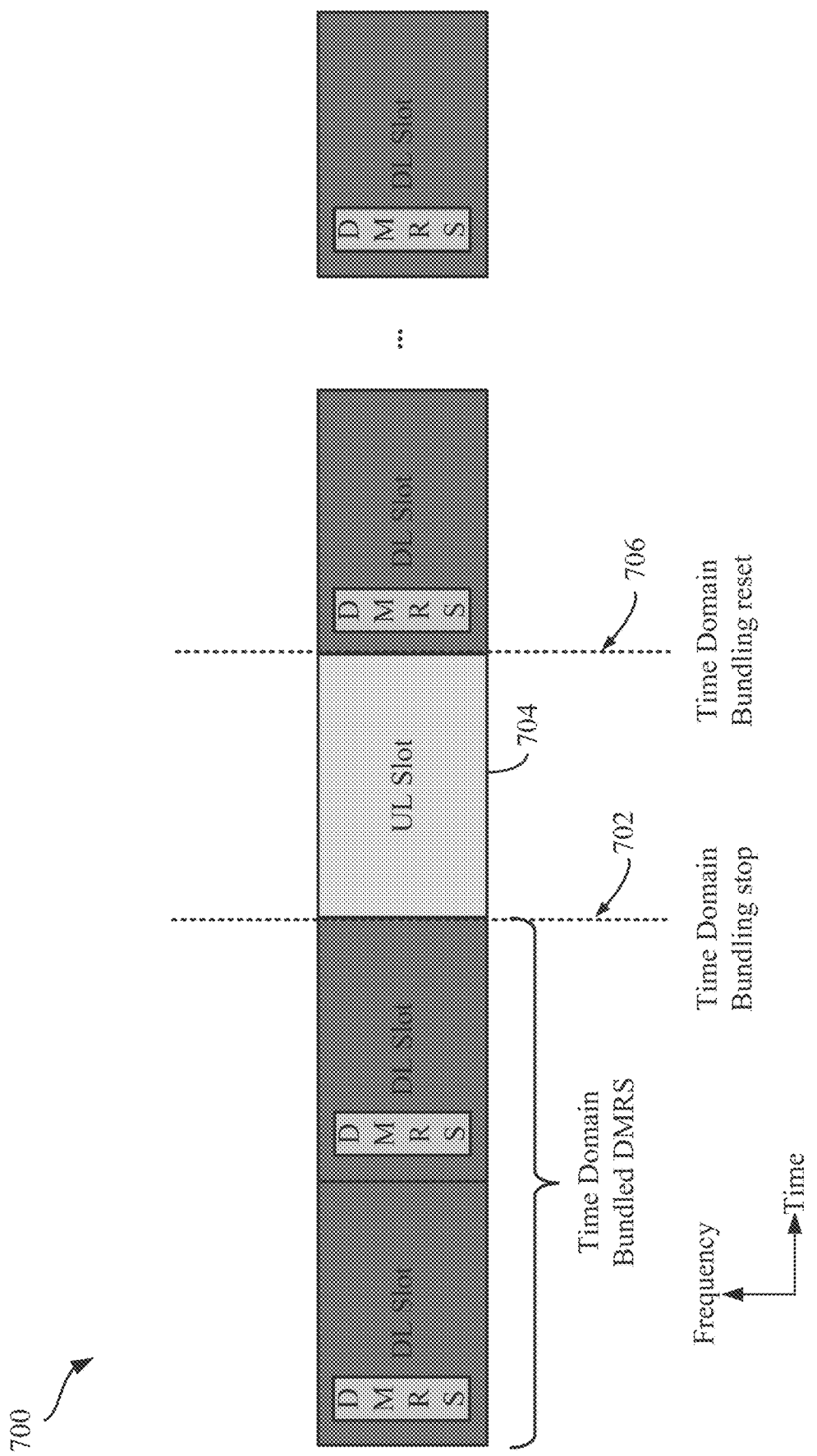
FIG. 7 illustrates an exemplary timing of stopping and restarting time domain bundling of DMRS signals.

According to further aspects, the stopping of DMRS time domain bundling is configured to be performed prior to the actual TCI state change, such as at the last DMRS symbol of the last DL channel transmission before the new TCI state is applied for the DL channel. As a visual example of this timing, FIG. 7 shows an approximate point in time 702 when time domain bundling of DMRS could be stopped prior to the TCI state change where a slot 704 is designated as an UL slot. After the transmission of UL slot 704, the time domain bundling of the DMRS could then be resumed (i.e., reset) as shown at time 706 when predetermined conditions occur, such as after the application the new TCI state.

According to yet further aspects, the determined TCI state change could be applicable to situations where the determined change in the TCI state includes one or more of (1) a change in one or more downlink (DL) reference signals (DL RS); (2) a change in a Quasi Co-Location (QCL) relationship between one or more downlink reference signals (DL RS) and at least one DMRS antenna port for the wireless transmission channel; (3) a second DL RS is added when there is only a first DL RS before the TCI state change; (4) a DL RS is removed when there are two DL RSs before the TCI state change; or (5) any combinations of situations (1)-(4). In still further aspects, method b600 may include determining a change in a QCL type when the TCI state is to be changed, and then determining whether to stop the time domain bundling based on the change in the QCL type. Of note, the process of stopping time domain bundling of the DMRS signals for any TCI state change or, more specifically to situations (1)-(5) above is a conservative approach and the method 600 may be further refined or more judiciously applied to more accurately determine only those situations that are necessary for stopping bundling to avoid the loss of processing gain by filtering when obtaining the channel estimate at a UE as will be discussed in connection with FIGS. 8-11.

Figure 8:
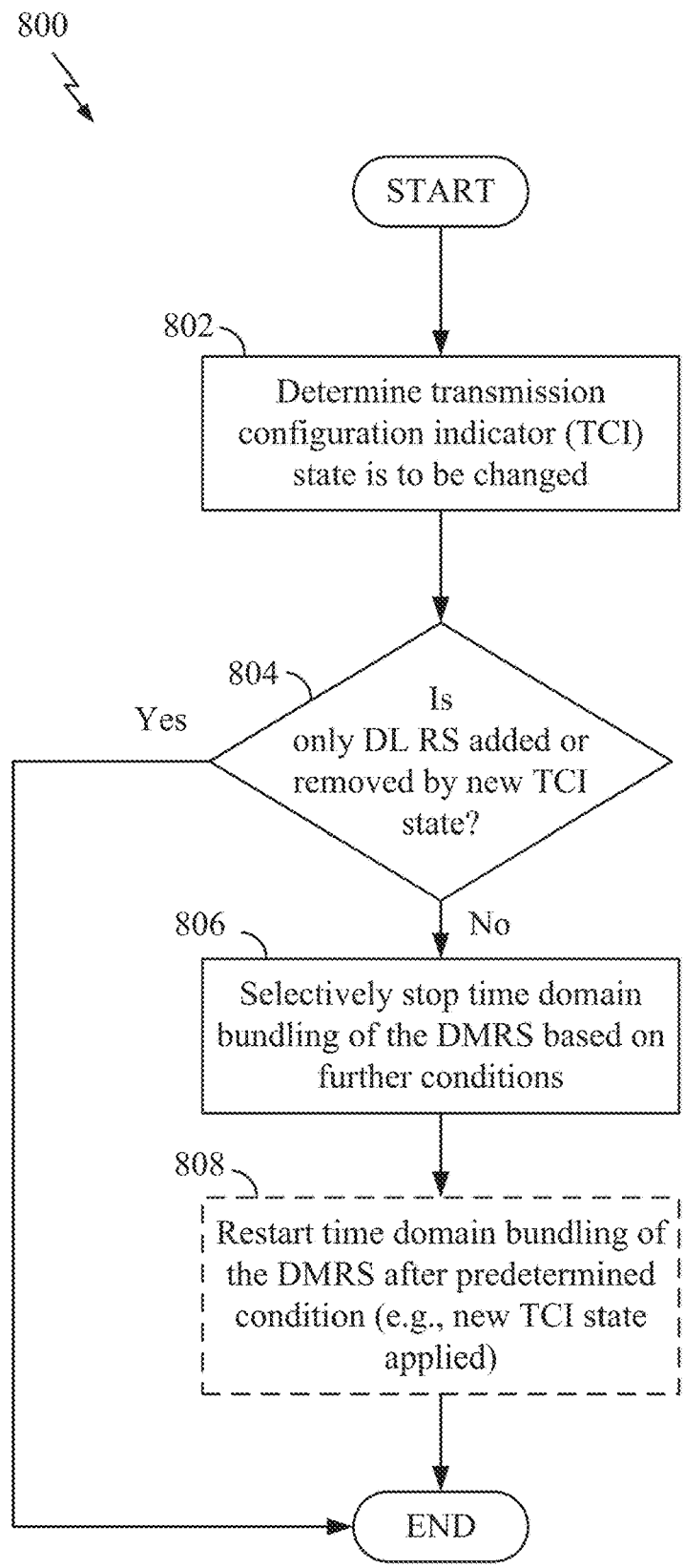
FIG. 8 is a flow diagram of another exemplary method for management of DMRS time domain bundling according to certain aspects of the present disclosure.

In particular regard to the selective stopping of the time domain bundling of the DMRS, it is noted that there are various conditions that may be tested or determined which do not necessarily contribute to loss of phase continuity even though a TCI change might occur. FIG. 8 illustrates an alternative method 800 for determining when selective stopping of time bundling of DMRS might be applied that takes into account at least one example of such conditions. As may be seen, method 800 includes first determining if a TCI state change is occurring as may be seen in block 802. After the TCI state change is determined, flow proceeds to decision block 804 to determine if only a DL RS is added or removed when the TCI state is to be changed. If so, the DMRS time domain bundling is not stopped and/or reset as shown by ending of the process 800. If the condition in block 804 is not met, flow may proceed to block 806 where the time domain bundling of DMRS may be selectively stopped. It is noted, however, that the selective stopping is nonetheless conditional as implied by the term "selective" and the decision to stop may be based on other factors and conditions, which may result in either stopping or no stopping dependent on these conditions. Further, method 800 may include a further optional process in block 808 of restarting DMRS time domain bundling when a predetermined condition is met, such as application of a new TCI state.

Figure 9:
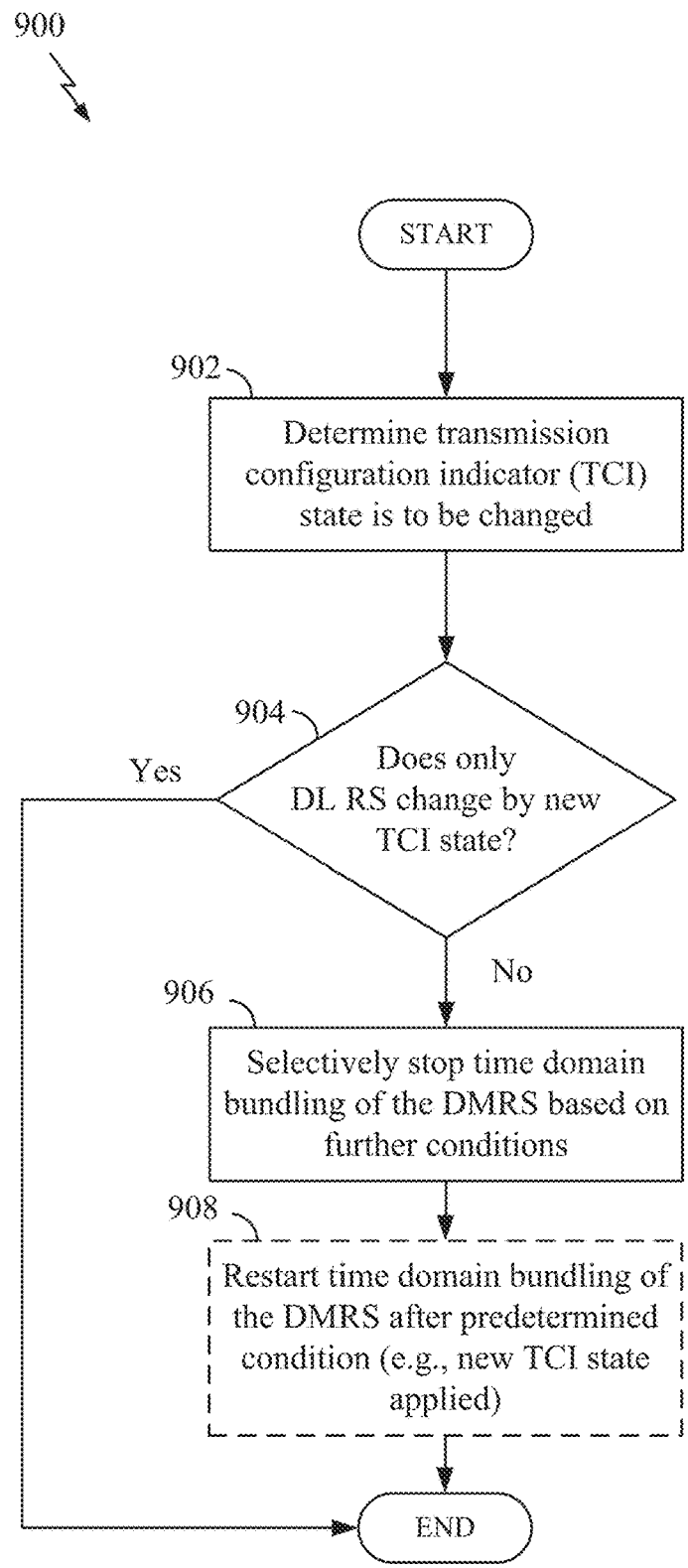
FIG. 9 is a flow diagram of a further exemplary method for management of DMRS time domain bundling according to certain aspects of the present disclosure.

FIG. 9 illustrates yet another method for determining when selective stopping of time bundling of DMRS might be applied that takes into account other conditions. As may be seen, method 900 includes determining if a TCI state change is occurring as shown in block 902. After the TCI state change is determined, flow proceeds to decision block 904 to determine if only a DL RS changes when the TCI state is to be changed. If so, the DMRS time domain bundling is not stopped and/or reset as shown by ending of the process 900. If the condition in block 1004 is not met, flow may proceed to block 906 where the time domain bundling of DMRS may be selectively stopped. It is noted, however, that the selective stopping is nonetheless conditional as implied by the term "selective" and the decision to stop may be based on other factors and conditions, which may result in either stopping or not. Further, method 900 may include a further optional process in block 908 of restarting DMRS time domain bundling when a predetermined condition is met, such as application of a new TCI state.

Figure 10:
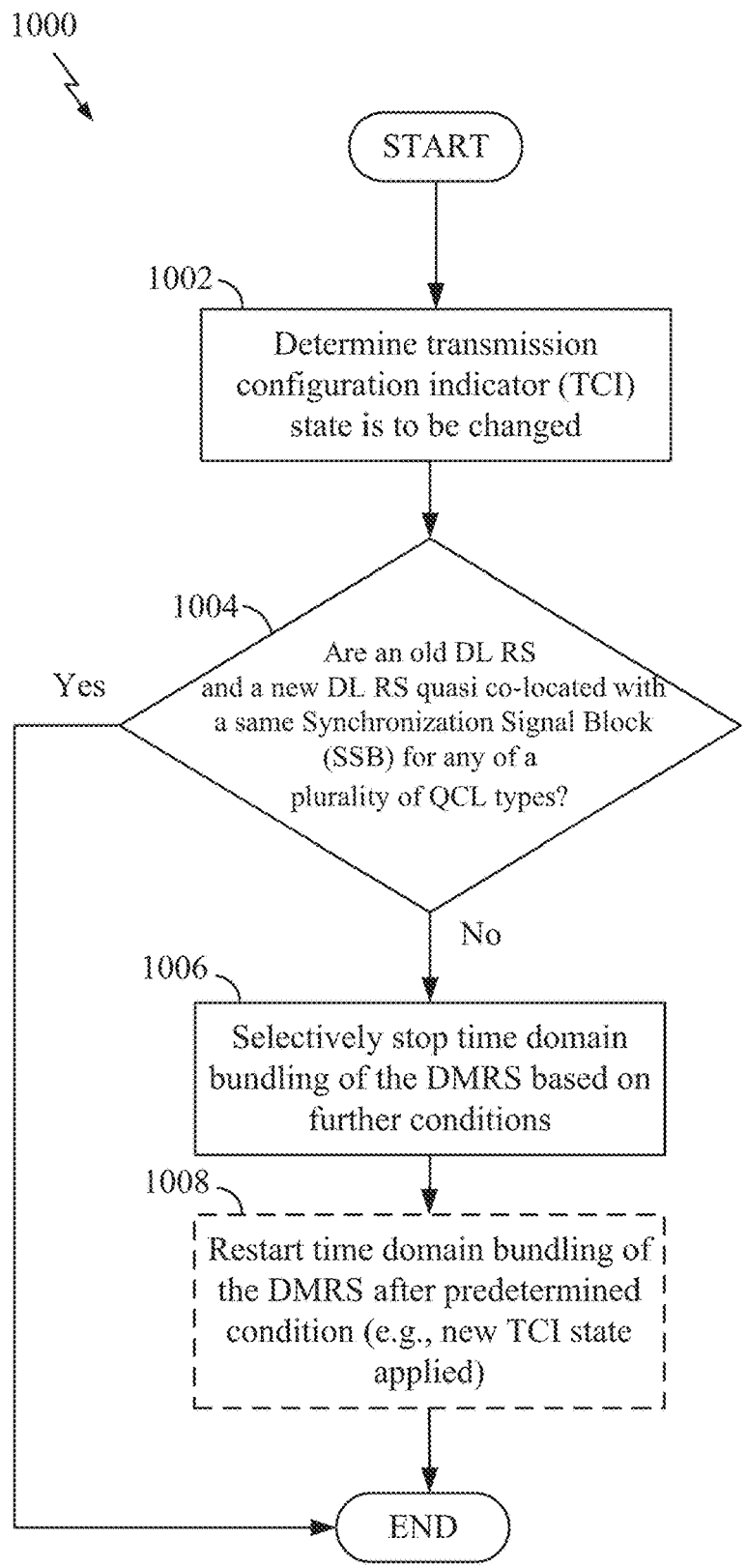
FIG. 10 is a flow diagram of yet another exemplary method for management of DMRS time domain bundling according to certain aspects of the present disclosure.

FIG. 10 shows a method 1000 for determining when the selective stopping of time bundling of DMRS might be applied that takes into account other conditions. Method 1000 includes determining if a TCI state change is occurring as shown in block 1002. After the TCI state change is determined, flow proceeds to decision block 1004 to determine if an old DL RS and a new DL RS are quasi co-located with a same Synchronization Signal Block (SSB) for any of a plurality of QCL types (e.g., QCL-typeD). If so, the DMRS time domain bundling is not stopped or reset as shown by ending of the process 1000. Otherwise, flow may proceed to block 1006 if the condition in block 1004 is not met, where the time domain bundling of DMRS may be selectively stopped. It is noted, however, that the selective stopping is nonetheless conditional as implied by the term "selective" and the decision to stop may be based on other factors and conditions, which may result in either stopping or not. Further, method 1000 may include a further optional process in block 1008 of restarting DMRS time domain bundling when a predetermined condition is met, such as when a new TCI state is applied.

Figure 11:
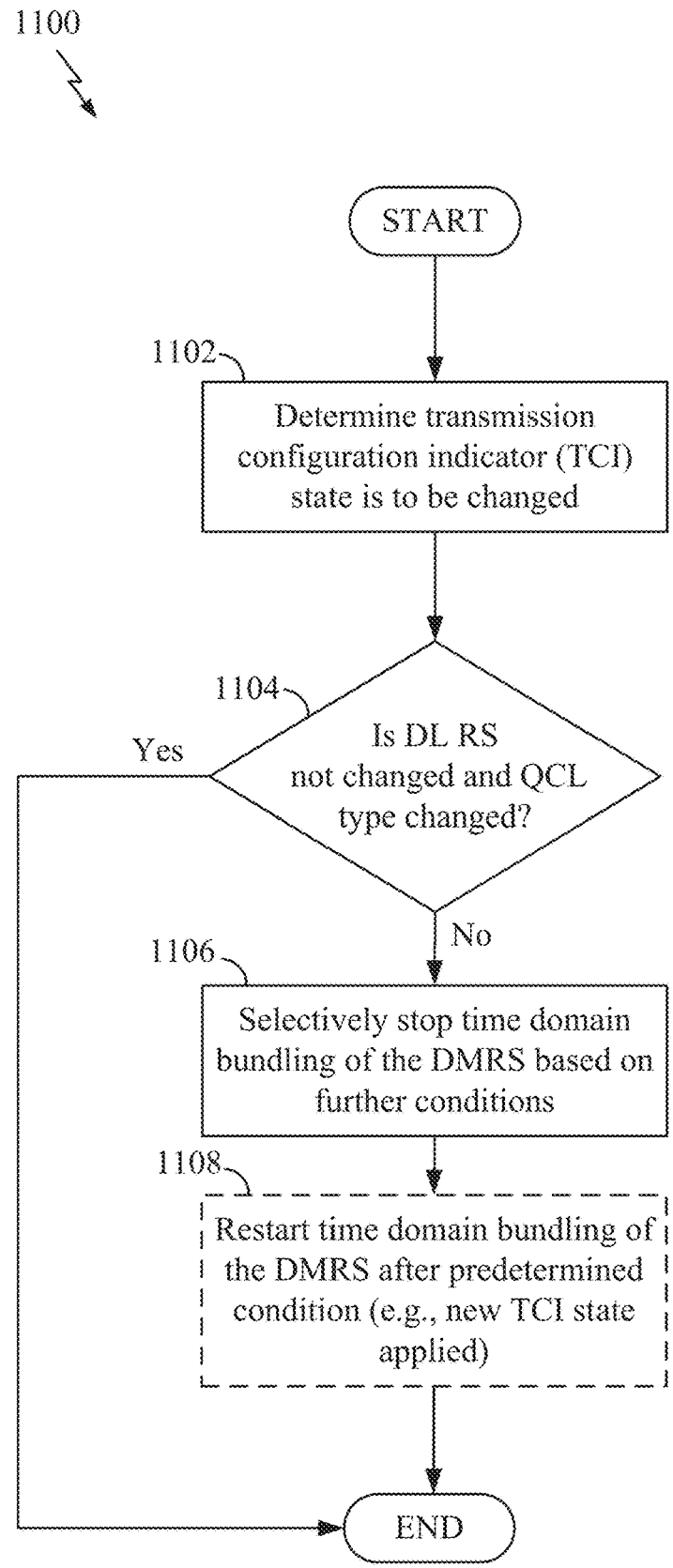
FIG. 11 is a flow diagram of still another exemplary method for management of DMRS time domain bundling according to certain aspects of the present disclosure.

FIG. 11 illustrates still another method 1100 for determining when selective stopping of time domain bundling of DMRS signaling might be applied that accounts for yet further conditions. As shown, method 1100 includes determining if a TCI state change is occurring as shown in block 1102. After the TCI state change is determined, flow proceeds to decision block 1104 to determine if the DL RS does not change and the QCL type is changed when the TCI is to be changed. If so, the DMRS time domain bundling is not stopped or reset as shown by ending of the process 1100.

According to still further aspects, method 600 shown in FIG. 6, for example, may include detecting a condition where time domain bundling of the DMRS stops, and then ensuring stopping of the DMRS time domain bundling after detection of the condition. According to yet further aspects, method 600 of FIG. 6, for example, may include sending an indication message from a network element in a wireless communication network to a user equipment (UE) in the wireless communication network, where the indication message includes information concerning conditions for which DMRS bundling will be stopped and conditions for which DMRS bundling does not stop. In further aspects, this indication message may be configured by a radio resource control (RRC) maintaining a list of TCI states for a plurality of QCL types.

In yet further aspects, the disclosed methodologies and apparatus may include sending configuration information from the network (e.g., a base station or gNB) a user equipment (UE) operable in a wireless communication network, such as the networks shown in FIGS. 1-3. The configuration information may include information concerning conditions for which DMRS bundling will be stopped and conditions for which DMRS bundling will not be stopped. This configuration information may be sent at any time and preconfigures the UE to perform any of the various functions or processes disclosed herein.

According to further aspects, the selective stopping of DMRS time domain bundling when a TCI state change may be implemented is configured to be implemented according to a same rule set for both PDCCH and PDSCH channels. Further, the selective stopping of DMRS time domain bundling when a TCI state change is to be implemented may be configured to be implemented in an independent manner for PDCCH and PDSCH channels with respectively different rule sets. In still other aspects, the selective stopping time domain bundling of the DMRS may be based on selectively applying a first rule set when a QCL type is changed due to a new TCI state configured by a wireless network and second rule set when the QCL type is changed according to a predetermined default QCL type. In yet other aspects, controlling time domain bundling of DMRS signals for a PDSCH channel may use a downlink link controller indicator (DCI), and, when the DCI and a new TCI state apply to a same PDSCH channel transmission, the transmission may be configured such that the DCI control overrides selective stopping of time domain when the change in the TCI state is determined.

According to still further aspects, controlling time domain bundling of DMRS signals for a PDSCH channel may utilize a downlink link controller indicator (DCI) and, when the DCI and a new TCI state apply to a same PDSCH channel transmission, the transmission may be configured such that the DCI control is required to match the resultant selective stopping of time domain when the change in the TCI state is determined.

Figure 12:
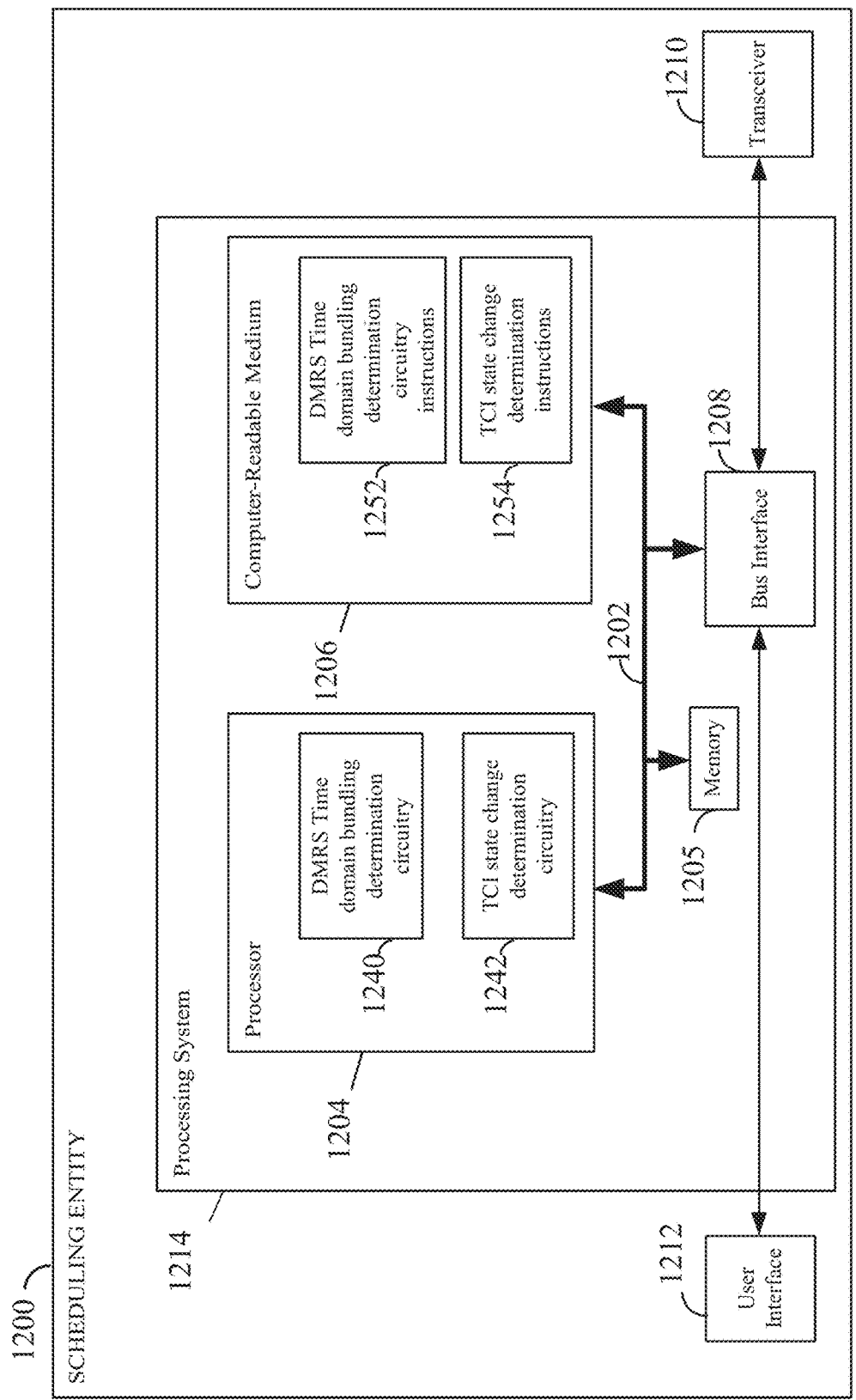
FIG. 12 is a block diagram illustrating an example of a hardware implementation for a scheduling entity apparatus employing a processing system.

FIG. 12 is a block diagram illustrating an example of a hardware implementation for a scheduling entity 1200 employing a processing system 1214. For example, the scheduling entity 1200 may be a user equipment (UE) as illustrated in any one or more of FIGS. 1-3. In another example, the scheduling entity 1200 may be a base station as illustrated in any one or more of FIGS. 1-3.

The scheduling entity 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1200 may be configured to perform any one or more of the functions described herein. That is, the processor 1204, as utilized in a scheduling entity 1200, may be used to implement any one or more of the processes and procedures described above and illustrated in the flow diagrams of FIGS. 6 and 8-11.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided.

In some aspects of the disclosure, the processor 1204 may include DMRS time domain bundling determination circuitry 1240 configured for various functions, including, for example, determining the control or management of DMRS time domain bundling by the scheduling entity 1200, such as was described in connection with FIGS. 5-11. Moreover, the circuit 1240 may include making a determination to reset DMRS time domain bundling after stopping according to predetermined conditions such as the implementation or application of a new TCI state, which may include interfacing with a TCI state determination circuitry 1242. Additionally, circuitry 1242 may make a determination when the TCI state is going to change (i.e., a new TCI state is going to be applied) and signal the circuitry 1240 to stop the time domain bundling of DMRS signals in the DL transmissions.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1206 may include control channel segment determining software or instructions 1252 and 1254 configured for various functions, including, for example, determining the control or management of DMRS time domain bundling by the scheduling entity 1200 and TCI state determinations, such as was described in connection with FIGS. 5-12. In further aspects, the instructions 1252 and 1254 may be implemented by circuitry 1240 and 1242, respectively.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1-3, and utilizing, for example, the processes and/or algorithms described herein in relation to FIGS. 5-12.

Figure 13:
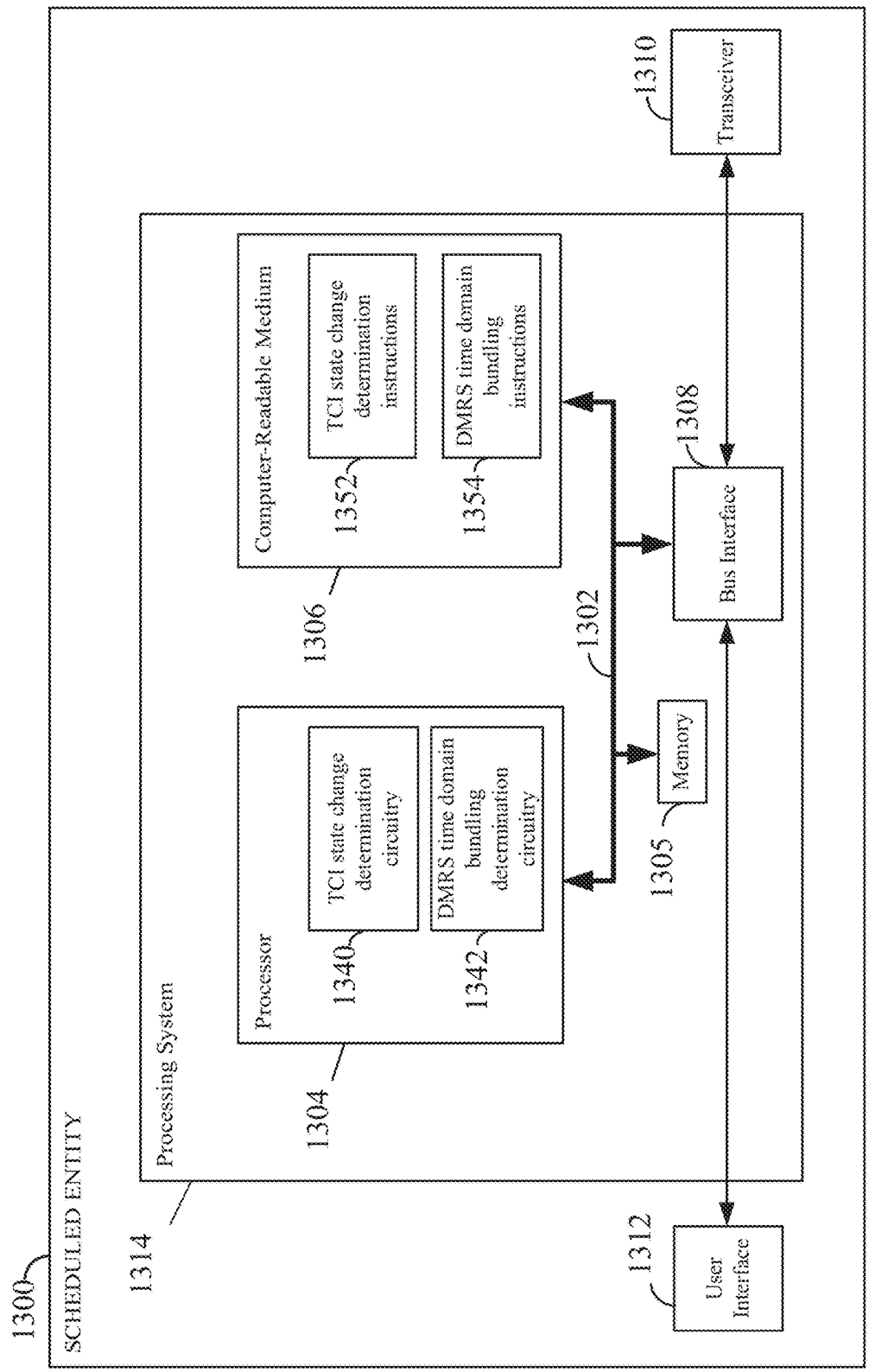
FIG. 13 is a block diagram illustrating an example of a hardware implementation for a scheduled entity apparatus employing a processing system.

FIG. 13 is a conceptual diagram illustrating an example of a hardware implementation for an exemplary scheduled entity 1300 employing a processing system 1314. In accordance with various aspects of the disclosure, an element, or any portion of an element, or any combination of elements may be implemented with a processing system 1314 that includes one or more processors 1304. For example, the scheduled entity 1300 may be a user equipment (UE) as illustrated in any one or more of FIGS. 1-3.

The processing system 1314 may be substantially the same as the processing system 1214 illustrated in FIG. 12, including a bus interface 1308, a bus 1302, memory 1305, a processor 1304, and a computer-readable medium 1306. Furthermore, the scheduled entity 1300 may include a user interface 1312 and a transceiver 1310 substantially similar to those described above in FIG. 13. That is, the processor 1304, as utilized in a scheduled entity 1300, may be used to implement any one or more of the processes described above and illustrated in FIGS. 5-11.

In some aspects of the disclosure, the processor 1304 may include TCI state change determination circuitry 1340 configured for various functions, including, for example, determining that a TCI state will change, such as when an UL slot is to be transmitted by the entity 1200 as was illustrated in FIG. 7. Additionally, processor 1304 may include DMRS time bundling determination circuitry 1342 that is configured to determine conditions and times when time bundling of DMRS signals such as those illustrated in FIG. 7, will be bundled or not (e.g., whether time bundling will be stopped or not). In another example, the circuitry 1340 may be configured to implement one or more of the functions described above in relation to the methods illustrated in FIGS. 5-11.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1-3, and utilizing, for example, the processes and/or algorithms described herein in relation to FIGS. 5-11. Instructions or software corresponding to the circuits 1340 and 1342 include instructions 1352 and 1354, respectively, which cause the processor 1304 to implement the functions of circuits 1340 and 1342, for example.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication comprising:
   determining a transmission configuration indicator (TCI) state is to be changed for a wireless transmission channel, the wireless transmission channel including time domain bundling of demodulation reference signals (DMRSs) across two or more symbols in the wireless transmission channel;
   responsive to determining that the TCI state is to be changed, selectively stopping time domain bundling of the DMRSs in the wireless transmission channel, wherein the stopping of the time domain bundling of the DMRSs is performed prior to the TCI state change; and
   applying a new TCI state after stopping the time domain bundling of the DMRSs.

2. The method of claim 1, further comprising:
   restarting time domain bundling of the DMRSs after applying the new TCI state.

3. The method of claim 1, wherein the determined change in the TCI state includes one or more of:
   a change in one or more downlink (DL) reference signals (DL RS);
   a change in a Quasi Co-Location (QCL) relationship between one or more downlink reference signals (DL RS) and at least one DMRS antenna port for the wireless transmission channel;
   a second DL RS is added when there is only a first DL RS before the TCI state change; and
   a DL RS is removed when there are two DL RS s before the TCI state change.

4. The method of claim 1, wherein the wireless transmission channel comprises one of a physical downlink shared channel (PDSCH) or a physical downlink control channel (PDCCH).

5. The method of claim 1, wherein selectively stopping the time domain bundling of the DMRSs further comprises:
   determining a change in a QCL type when the TCI state is to be changed; and
   determining whether to stop the time domain bundling based on the change in the QCL type.

6. The method of claim 1, wherein selectively stopping the time domain bundling of the DMRSs further comprises not stopping the time domain bundling of the DMRSs if at least one of:
   a DL RS is added or removed when the TCI state is to be changed; or
   the DL RS changes when the TCI state is to be changed.

7. The method of claim 1, wherein selectively stopping the time domain bundling of the DMRSs further comprises not stopping the time domain bundling of the DMRSs if an old DL RS and a new DL RS are quasi co-located with a same Synchronization Signal Block (SSB) for any of a plurality of QCL types.

8. The method of claim 1, wherein selectively stopping the time domain bundling of the DMRSs further comprises not stopping the time domain bundling of the DMRSs if the DL RS does not change and a QCL type is changed when the TCI state is to be changed.

9. The method of claim 1, wherein selectively stopping the time domain bundling of the DMRSs further comprises:
   detecting a condition where time domain bundling of the DMRSs stops; and
   stopping the DMRSs bundling after detection of the condition.

10. The method of claim 1, further comprising:
    sending an indication message from a network element in a wireless communication network to a user equipment (UE) in the wireless communication network, wherein the indication message includes information concerning conditions to stop DMRS bundling and conditions to not stop DMRS bundling.

11. The method of claim 1, further comprising:
sending configuration information to configure a user equipment (UE) operable in a wireless communication network, wherein the UE configuration information includes information concerning conditions to stop DMRS bundling and conditions to not stop DMRS bundling.

12. The method of claim 1, wherein the selective stopping of DMRSs time domain bundling responsive to the determination that the TCI state is to be changed is implemented according to a same rule set for both PDCCH and PDSCH channels.

13. The method of claim 1, wherein the selective stopping of DMRSs time domain bundling responsive to the determination that the TCI state is to be changed is implemented in an independent manner for PDCCH and PDSCH channels with respectively different rule sets.

14. The method of claim 1, wherein the selective stopping time domain bundling of the DMRSs is based on selectively applying a first rule set when a QCL type is changed due to a new TCI state configured by a wireless network and second rule set when the QCL type is changed according to a predetermined default QCL type.

15. The method of claim 1, further comprising:
controlling time domain bundling of DMRSs signals for a PDSCH channel using a downlink link controller indicator (DCI); and
when the DCI and a new TCI state apply to a same PDSCH channel transmission, configuring the transmission:
 (a) where the DCI control overrides selective stopping of time domain when the change in the TCI state is determined; or
 (b) where the DCI control is required to match the resultant selective stopping of time domain when the change in the TCI state is determined.

16. An apparatus for wireless communication, comprising:
a processor;
a transceiver configured to be communicatively coupled to the processor; and
a memory configured to be communicatively coupled to the processor,
wherein the processor is configured to:
 determine a transmission configuration indicator (TCI) state is to be changed for a wireless transmission channel, the wireless transmission channel including time domain bundling of demodulation reference signals (DMRSs) across two or more symbols in the wireless transmission channel;
 responsive to determining that the TCI state is to be changed, selectively stop time domain bundling of the DMRSs in the wireless transmission channel, wherein the stopping of the time domain bundling of the DMRSs is performed prior to the TCI state change; and
 apply a new TCI state after stopping of the time domain bundling.

17. The apparatus of claim 16, wherein the processor is configured to:
restart time domain bundling of the DMRSs after application of the new TCI state.

18. The apparatus of claim 16, wherein the determined change in the TCI state includes one or more of:
a change in one or more downlink (DL) reference signals (DL RS);
a change in a Quasi Co-Location (QCL) relationship between one or more downlink reference signals (DL RS) and at least one DMRS antenna port for the wireless transmission channel;
a second DL RS is added when there is only a first DL RS before the TCI state change; and
a DL RS is removed when there are two DL RSs before the TCI state change.

19. The apparatus of claim 16, wherein the processor is further configured to selectively stop the time domain bundling of the DMRSs by:
determining a change in a QCL type when the TCI state is to be changed; and
determining whether to stop the time domain bundling based on the change in the QCL type.

20. The apparatus of claim 16, wherein the processor is further configured to selectively stop the time domain bundling of the DMRSs by:
not stopping the time domain bundling of the DMRSs if a DL RS is added, removed, or changed when the TCI state is to be changed.

21. The apparatus of claim 16, wherein the processor is further configured to selectively stop the time domain bundling of the DMRSs by:
not stopping the time domain bundling of the DMRSs if an old DL RS and a new DL RS are quasi co-located with a same Synchronization Signal Block (SSB) for any of a plurality of QCL types.

22. The apparatus of claim 16, wherein the processor is further configured to selectively stop the time domain bundling of the DMRSs by:
not stopping the time domain bundling of the DMRSs if the DL RS does not change and a QCL type is changed when the TCI state is to be changed.

23. The apparatus of claim 16, wherein the processor is further configured to selectively stop the time domain bundling of the DMRSs by:
detecting a condition where time domain bundling of the DMRSs stops; and
stopping the DMRS bundling after detection of the condition.

24. The apparatus of claim 16, wherein the processor is further configured to send an indication message from a network element in a wireless communication network to a user equipment (UE) in the wireless communication network, wherein the indication message includes information concerning conditions to stop DMRS bundling and conditions to not stop DMRS bundling.

25. The apparatus of claim 16, wherein the processor is further configured to selectively stop DMRS time domain bundling responsive to the determination that the TCI state is to be changed according to a same rule set for both PDCCH and PDSCH channels.

26. The apparatus of claim 16, wherein the processor is further configured to selectively stop DMRS time domain bundling responsive to the determination that the TCI state is to be changed in an independent manner for PDCCH and PDSCH channels with respectively different rule sets.

27. The apparatus of claim 16, wherein the processor is further configured to selectively stop time domain bundling of the DMRSs based on selectively applying a first rule set when a QCL type is changed due to a new TCI state configured by a wireless network and second rule set when the QCL type is changed according to a predetermined default QCL type.

28. The apparatus of claim 16, wherein the processor is further configured to:
control time domain bundling of DMRS signals for a PDSCH channel using a downlink link controller indicator (DCI); and
responsive to a condition where the DCI and a new TCI state apply to a same PDSCH channel transmission, configure the transmission:
(a) where the DCI control overrides selective stopping of time domain bundling responsive to the change in the TCI state being determined; or
(b) where the DCI control is required to match the resultant selective stopping of time domain bundling responsive to the change in the TCI state being determined.

29. An apparatus for wireless communication, comprising:
means for determining a transmission configuration indicator (TCI) state is to be changed for a wireless transmission channel, the wireless transmission channel including time domain bundling of demodulation reference signals (DMRSs) across two or more symbols in the wireless transmission channel;
responsive to determining that the TCI state is to be changed by the means for determining the TCI state is to be changed, means for selectively stopping time domain bundling of the DMRSs in the wireless transmission channel, wherein the stopping of the time domain bundling of the DMRSs is performed prior to the TCI state change; and
means for applying a new TCI state after stopping of the time domain bundling.

30. A non-transitory computer-readable medium storing computer-executable code, comprising code for causing a computer to:
determine a transmission configuration indicator (TCI) state is to be changed for a wireless transmission channel, the wireless transmission channel including time domain bundling of demodulation reference signals (DMRSs) across two or more symbols in the wireless transmission channel;
responsive to the determination that the TCI state is to be changed, selectively stop time domain bundling of the DMRSs in the wireless transmission channel wherein the stopping of the time domain bundling is performed prior to the TCI state change; and
apply a new TCI state after stopping of the time domain bundling.

* * * * *